United States Patent [19]

Brunion et al.

[11] Patent Number: 4,540,622
[45] Date of Patent: Sep. 10, 1985

[54] FLEXIBLE, TRANSPARENT PANE FOR USE AS A WINDOW

[75] Inventors: Hans-Georg Brunion, Stolberg; Christian Hiemenz, Herzogenrath; Hans Heuser; Helmer Rädisch, both of Aachen, all of Fed. Rep. of Germany

[73] Assignee: Saint-Gobain Vitrage, Courbevoie, France

[21] Appl. No.: 627,588

[22] Filed: Jul. 3, 1984

Related U.S. Application Data

[63] Continuation of Ser. No. 459,112, Jan. 19, 1983, abandoned.

[30] Foreign Application Priority Data

Jan. 22, 1982 [DE] Fed. Rep. of Germany ....... 3201849

[51] Int. Cl.³ .............................................. B32B 27/40
[52] U.S. Cl. .................................... 428/216; 428/215; 428/337; 428/339; 428/336; 428/412; 428/423.1; 428/423.3; 428/334
[58] Field of Search ........ 428/412, 215, 216, 334–336, 428/337, 339, 423.1, 423.3

[56] References Cited

U.S. PATENT DOCUMENTS

| | | | |
|---|---|---|---|
| 2,193,469 | 3/1940 | Ashton | 135/5 |
| 4,079,160 | 3/1978 | Philipson | 428/412 |
| 4,166,149 | 8/1979 | Müller | 428/412 |
| 4,169,181 | 9/1979 | Molari | 428/412 |
| 4,242,415 | 12/1980 | Feltzin | 428/412 |
| 4,321,296 | 3/1982 | Rougier | 428/412 |

FOREIGN PATENT DOCUMENTS

| | | |
|---|---|---|
| 054491 | 6/1982 | European Pat. Off. . |
| 1953276 | 6/1970 | Fed. Rep. of Germany . |
| 1679930 | 3/1972 | Fed. Rep. of Germany . |
| 2452928 | 5/1975 | Fed. Rep. of Germany . |
| 2629779 | 5/1978 | Fed. Rep. of Germany . |
| 2851394 | 5/1979 | Fed. Rep. of Germany . |
| 2917105 | 11/1980 | Fed. Rep. of Germany . |
| 1232682 | 5/1971 | United Kingdom . |
| 1461817 | 1/1977 | United Kingdom . |
| 1576394 | 10/1980 | United Kingdom . |
| 2044686 | 10/1980 | United Kingdom . |

Primary Examiner—Ellis P. Robinson
Attorney, Agent, or Firm—Pennie & Edmonds

[57] ABSTRACT

A multilayer plastic foil for use as a window. The foil includes a core and a pair of cover layers and includes features of flexibility, durability, scratch resistance, among others, for application of the window for a convertible top vehicle. The pane may include a heating capability.

9 Claims, 1 Drawing Figure

U.S. Patent      Sep. 10, 1985      4,540,622
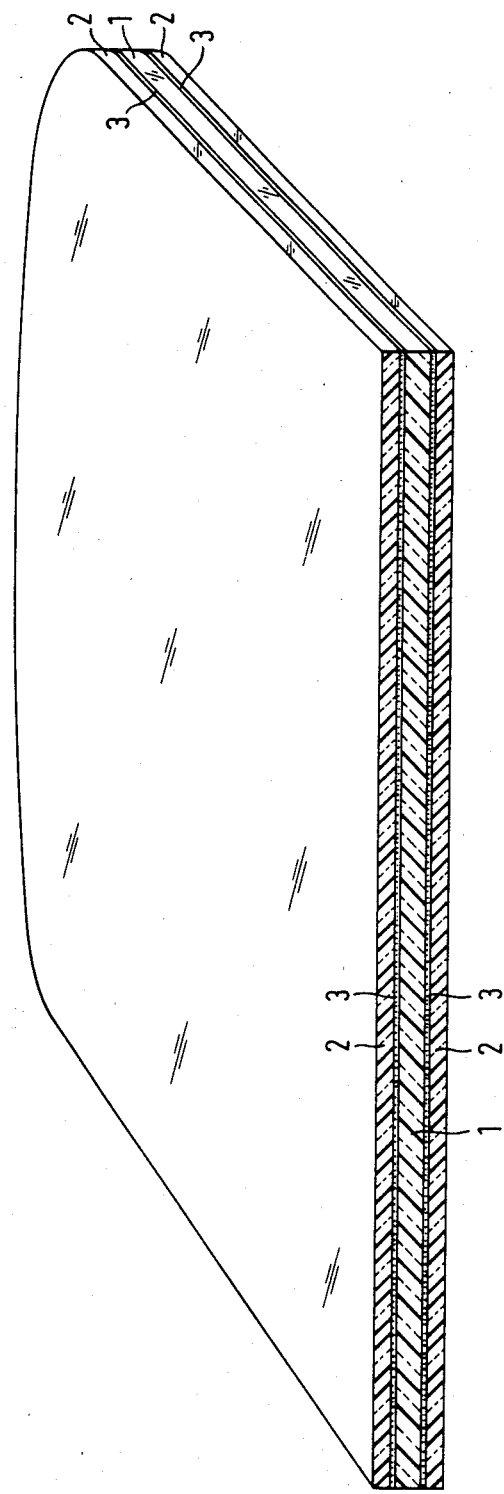

FLEXIBLE, TRANSPARENT PANE FOR USE AS A WINDOW

CROSS-REFERENCE TO RELATED APPLICATIONS

This application is a continuation of application Ser. No. 459,112, filed Jan. 19, 1983, now abandoned.

Description

TECHNICAL FIELD

The invention relates to a flexible, transparent pane for use as a window, and especially a window of a foldable top for a convertible car.

BACKGROUND OF THE INVENTION

As may be appreciated, several partly contradictory criteria come to the fore in the consideration of transparent panes for use as a window in the foldable top for a convertible car. For one thing, as the use suggests, the pane must display good optical characteristics, thereby to guarantee not only good viewing but distortion-free viewing. The pane, also, must be sufficiently stiff so that in its stretched state, that is, when the foldable top is in place to enclose the passenger compartment, the pane will be substantially free or as free as possible of any undulations as may be occasioned by a folding of the pane when the foldable top is in a retracted position. On the other hand, the pane must be characterized by sufficient flexibility so that it may follow the folding process as the convertible top is retracted from the passenger compartment enclosing position. This is the case since the pane is integrated in the convertible top and buckling of the pane is to be avoided. The pane, further, must display good stretch resistance, and the optical characteristics should not be deleteriously effected by a scratched surface. The characteristics, finally, should remain during a long period of time under temperature conditions which may range from −40° C. to +80° C.

At this time there is no pane known to the prior art that includes all of the required characteristics, let alone these characteristics in optimum fashion. To this end, for example, if the characteristic of flexibility is increased to follow the folding process, it oftentimes is increased at the sacrifice of its optical characteristics, and vice versa. Oftentimes, however, the flexibility of the pane leaves something to be desired. Moreover, in the case of all plastic panes, the scratch resistance of the surfaces is poor, so that after use, the optical characteristics are poor. These characteristics are even more strongly affected by extended use, and it is not uncommon that the theretofore transparent pane becomes somewhat translucent. The disturbing effect on transparency has been discovered during use of panes, such as panes of polyvinyl chloride of about 1.5 mm in thickness.

SUMMARY OF THE INVENTION

The invention is directed to a flexible, transparent pane made of plastic for use, among other uses, as a window of a foldable top for a convertible car. Particularly, the invention is directed to such a pane having a high elastic deformability characteristic, a high capacity for resistance against scratchlike and rubbing stresses, and a pane which retains these characteristics over a prolonged time upon exposure to a wide range of temperature of about −40° C. to about +80° C.

The transparent pane of the invention may be in the form of a multilayer foil, which preferably includes a core and a pair of cover layers. The core is formed of a thrust and tear resistant plastic, while the cover layers preferably are formed of a plastic characterized by high elasticity and self-healing. Polyurethane may be used for the cover layers, each of which will be about 0.2 to 0.5 mm thick. The core may range in thickness but usually not more than 1 mm.

Multilayer foils which display these characteristics provide several advantages. These advantages render the multilayer foil particularly suitable for use as a window of a foldable top for a convertible, as well as similar purposes of application. These advantages include, among other features, high flexibility, high scratch resistance of the self-healing cover layers, an insensitivity of the cover layers to temperature, and durability over long periods of time. It has also been found that the multilayer foil comprising the transparent pane of the invention has good processibility and may be easily sewn into the window opening of a fabric. In this connection, the core provides the necessary tear resistance and the cover layers provide the self-healing characteristic whereby the needle holes of the sewing needle subsequently close tightly to prevent the penetration of moisture and water into the passenger compartment.

The cover layer of the multilayer foil facing the outside protects the window pane from scratchings by outside influences, for example, from resort to cleaning measures, the removal of precipitation including snow and ice, among other things. The cover layer facing the inside protects the window pane from damage by any rubbing stresses to which this surface may be exposed in its folded up state, or as the convertible top is retracted to the folded up state. Thus, in part, the rubbing stresses may result from adjacent surfaces touching and rubbing against one another. This action may follow and result from vibrations of the automobile during movement. The entire process of folding the window pane, however, is facilitated by the soft, high elastic cover layers.

It has been mentioned that the window pane of the invention may serve in a myriad of other capacities, but in the same manner for all of these capacities. For example, the window pane may be used in the tarpaulin of a truck, for window in a tent, for windows in the sails of sail boats, and other uses.

The cover layers of the multilayer foil may be applied to a core according to any of the prior art processes including, for example, spraying, dipping, and the like.

BRIEF DESCRIPTION OF THE DRAWING

The FIGURE is a perspective view of the multilayer foil of the invention.

BEST MODE FOR CARRYING OUT THE INVENTION

Referring to the FIGURE, according to a first form of the invention, the core of the multilayer foil comprises a layer of polycarbonate, and the cover layers comprise a polyurethane with self-healing characteristics. Each cover layer has a thickness of about 0.4 mm, and the core has a thickness of about 0.3 to about 0.8 mm.

According to another form of the invention, the core of the multilayer foil comprises a layer having a thickness of about 0.2 to about 1 mm. The cover layers may be similar to the cover layers of the first form. The core of this form comprises a polyurethane urea material having high linear structure and aliphatically or cycloaliphatically bound urethane and urea segments. This material is relatively soft when compared with polycarbonate.

The polyurethane urea material, more particularly, may be produced by reaction of an isocyanate group containing prepolymer with aliphatic or cycloaliphatic primary diamines having an average molecular weight of 60 to 340. The isocyanate group containing prepolymer is formed of a polyester diol, or of a polyether diol having an average molecular weight of 500 to 4000, a mixture of polyester and polyether diols, and it may be formed of short-chained aliphatic diols with molecular weights of 62 to 250 with a quantity of an aliphatic or cycloaliphatic diisocyanate sufficient to be in excess in relation to the free hydroxyl groups.

Preferred embodiments of the window pane will be described with reference to the following examples.

EXAMPLE I

A core comprises a clear, transparent lamina of polycarbonate, having a thickness of about 0.5 mm. The lamina, for example, may be a commercially available product of the General Electric Company, sold under the trademark LEXAN. A pair of cover layers 2, in the form of a foil, are applied to the core and adhered by an adhesive layer 3. The cover layers are each about 0.4 mm in thickness and the adhesive layer, for forming a lasting multilayer foil, may be about 0.02 mm in thickness.

The foil comprising each cover layer 2 may be produced according to known process techniques. To this end, a homogeneous mixed reactive casting resin, free of solvent, having a composition including an aliphatic polyether having free hydroxyl groups and an aliphatic polyisocyanate (described in German Offenlegungsschrift 24 52 928) is poured on an optically perfect casting support, such as a glass pane. The resin is poured in sufficient quantity to form a film having a thickness of 0.4 mm. The resin, with the use of heat, as desired, is completely polymerized in situ.

Thereafter, an adhesive is poured on the layer and completely polymerized in situ. The adhesive is in the form of a solution. When the solvent has evaporated, the glass plate will support a two layer laminate, comprising a cover layer, which may be pulled off the casting support.

The resin and adhesive may be poured through use of a squeezing pouring head. The adhesive may be a thermoplastic polyurethane adhesive layer and the production of the adhesive coated cover layer may be as described in detail in German Offenlengungsschrift 26 29 779.

The adhesive coated cover layer, then, may be laminated to the core by application of heat and pressure according to known practices. For example, the laminating process may include the use of a laminating roller which rolls the lamina layers which either simultaneously or subsequently are heated to a temperature of about 120° C.

If the laminated, transparent foil pane is to be dyed, it may be submerged in a coloring solution. The result of this process step is the coloring of the cover layers. The intensity, or shade, may be determined by the length of time of submersion of the laminated foil in the coloring solution. This process may be as described in French Pat. No. 2,467,908.

EXAMPLE II

A core 1 comprises a clear, transparent lamina of a thermoplastic polyurethane urea, having a thickness of about 0.6 mm.

The polyurethane urea is produced by gassifying 1000 g of a linear polyester in a protective atmosphere of nitrogen after vacuum drying at 0.02 bar and 110° C. and cooled within that atmosphere to 80° C. The polyester is initially obtained by reaction of adipic acid with tetramethylene glycol and has an average molecular weight of about 2250 and a content of free OH- groups of about 1.5%.

496 g of isophorene diisocyanate having a content of free NCO- groups of about 37.5% are added to the melt first obtained and the mixture is reacted at about 90° C. into an NCO-containing prepolymer.

After about 3 hours, an additional 121 g of tetramethylene glycol is added to the mixture. The additional tetramethylene glycol serves the purpose of pre-elongating the chain. At the time of the addition, the temperature is increased to 120° C. for 1 hour.

Then, 1.5 liter of xylene is added to the prepolymer melt. After cooling the prepolymer melt solution to about 30° C., 73 g of isophorone diamine are added thereby to complete elongation of the chain.

The clear and highly viscous solution is poured onto glass plates to form an optically perfect film as evaporation of the solution commences.

Thereafter, a second reaction mixture is produced by reaction and mixture of 1000 g of a polyether having a molecular weight of about 450 and a content of free OH-groups of from about 10.5 to 12%, 0.5 g of tin dibutyl dilaurate, 1000 g of a biuret or triisocyanurate of 1,6-hexamethylene diisocyanate with a content of free NCO- groups of 21 to 24%, 30 g of bis(1,2,2,6,6-pentamethyl-4-piperidyl)sebacate, and 20 g of 2-(2 hydroxy-3,5-di-tert.-amylphenyl)2H-benztrizole which are mixed homogeneously in a vessel under pressure. (The polyether of the mixture may be produced by reaction of propylene oxide with a triol, such as glycerin or trimethylpropane, for example).

The reaction mixtures are poured one after the other on to a casting support in sufficient quantity to form a core having a thickness of layer of about 0.5 mm. The poured reaction mixtures are allowed to completely polymerize through the reaction of heat. On the other hand, it is possible to produce from this reaction mixture first of all about 0.5 mm thick foils according to the casting process, and to laminate these foils directly on to the two surfaces of the core through use of heat and pressure.

The cover layers are exposed directly to the radiation of the sun. Accordingly, it may be desired to add a light stabilizer and a UV absorber. The addition, conveniently may be to the reaction mixture. As a light stabilizer, it is possible to use chemical compounds from the class of the sterically impeded amines. For example, the compound may be a bis (2,2,6,6-tetramethyl-4-piperidyl)sebacate or a bis(1,2,2,6,6-pentamethyl-4-piperidyl)sebacate. Each of these compounds has been proven effective. The light stabilizer may be added to the reaction mixture in a quantity up to 9% by weight related to the reaction mixture ready for casting. Optimum results with regard to UV stability may be achieved by an addition of about 5% of the compound. Significantly smaller additions, for example, an addition on the order of magnitude of 1% by weight has been found to provide satisfactory results.

The complementary use of a light stabilizer and UV absorber has proven itself.

Quantities between 0.1 and 5% by weight may be used. An addition of 2-(2-hydroxy-5-methyl-phenyl)-2H-benztriazole in an amount of about 1% by weight related to the reaction mixture ready for casting has had a satisfactory effect as a UV absorber.

EXAMPLE III

The window pane of the invention may be electrically heated. Under these circumstances, a core 1 of a thermoplastic polyurethane urea, having a thickness of about 0.6 mm is produced according to Example II. Electric heating conductors (wires) are embedded on the surface. The manner of embedding the heating wires may be carried out in accordance with conventional techniques, such as the technique described in German Auslegesschrift 16 79 930. A printable conducting paste, providing an electrically heating function, may be used in substitution for the heating wires and may be applied to the surface of the core by a printing process, such as a screen printing process. Suitable printable conducting pastes may be obtained commercially. The heating wires or conducting paste is connected to a connector element or with current connecting wires for connection of the electric heater across a power source. A pair of cover layers formed of highly elastic polyurethane, and each having a thickness of about 0.5 mm are disposed on opposite sides of the core. The cover layers may be formed according to the process of Example II.

We claim:

1. A flexible, transparent plastic pane for use as a window characterized in that said pane is a laminate including a core comprised of polycarbonate having a thickness of about 0.3 to about 0.8 mm and having both thrust and tear reistant properties, a pair of cover layers, at least one of said layers being colored, comprised of an elastic prefabricated polyurethane foil, containing a light stabilizer and a UV-absorber, having a self-healing property, each said cover layer having a thickness of abut 0.2 to about 0.5 mm, and an adhesive of thermoplastic polyurethane disposed between said core and each said cover layer.

2. The pane of claim 1 wherein said core is comprises of polycarbonate having a thickness of about 0.3 to about 0.8 mm, and said cover layers have a thickness of about 0.4 mm.

3. The pane of claim 2 wherein said core has a thickness of about 0.5 mm, and said cover layers have a thickness of about 0.4 mm.

4. A flexible, transparent plastic pane for use as a window characterized in that said pane is a laminate including a core comprised of polyurethane urea having high linear molecular structure and including aliphatically or cycloaliphalically bound urethane and urea segments, said core having a thickness of about 0.2 to 1.0 mm having both thrust and tear resistant properties, said core having a thickness of no more than 1 mm, and a pair of cover layers, at least one of said layers being colored, said cover layers being comprised of an elastic prefabricated polyurethane foil, containing a light stabilizer and UV-absorber, having a self-healing property, each said cover layer having a thickness of about 0.2 to about 0.5 mm, and an adhesive of thermoplastic polyurethane disposed between said core and each cover layer.

5. The pane of claim 4 characterized in that the material of the core is produced by reaction of an isocyanate group containing prepolymer, and aliphatic or cycloaliphatic primary diamines of an average molecular weight beteen 60 and 340, said prepolymer having an excess quantity of an aliphatic or cycloaliphatic diisocyanate in relation to the free hydroxyl groups.

6. The pane of claim 5 wherein the prepolymer is formed from a polyester diol having an average molecular weight between 500 and 4000.

7. The pane of claim 5 wherein the prepolymer is formed from a polyether diol having an average molecular weight between 500 and 4000.

8. The pane of claim 5 wherein the prepolymer is formed from a mixture of polyether and polyester diol having a combined average molecular weight between 500 and 4000.

9. The pane of claim 5 wherein said prepolymer is formed from a short chained aliphatic diol having an average molecular weight between 62 and 250.

* * * * *

UNITED STATES PATENT AND TRADEMARK OFFICE
CERTIFICATE OF CORRECTION

PATENT NO. : 4,540,622

DATED : September 10, 1985

INVENTOR(S) : Hans-Georg Brunion et al

It is certified that error appears in the above-identified patent and that said Letters Patent is hereby corrected as shown below:

Col. 5, line 41, "reistant" should be --resistant--

Signed and Sealed this

Twenty-second Day of April 1986

[SEAL]

Attest:

DONALD J. QUIGG

Attesting Officer      Commissioner of Patents and Trademarks